(12) United States Patent
Handshaw et al.

(10) Patent No.: US 10,803,270 B2
(45) Date of Patent: Oct. 13, 2020

(54) SCAN CUBE CHARACTERISTICS

(71) Applicant: Zebra Technologies Corporation, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/212,936

(22) Filed: Dec. 7, 2018

(65) Prior Publication Data
US 2020/0184159 A1 Jun. 11, 2020

(51) Int. Cl.
G06K 15/12 (2006.01)
G06K 7/10 (2006.01)
G06K 7/14 (2006.01)

(52) U.S. Cl.
CPC ......... G06K 7/109 (2013.01); G06K 7/10722 (2013.01); G06K 7/1413 (2013.01); G06K 2007/10524 (2013.01)

(58) Field of Classification Search
CPC ....... G06K 7/14; G06K 7/10881; G06K 7/109
USPC ............. 235/462.41, 462.43, 462.45, 472.02
See application file for complete search history.

(56) References Cited

U.S. PATENT DOCUMENTS

| 4,814,759 A | * | 3/1989 | Gombrich | G06F 1/1601 345/60 |
| 2002/0023960 A1 | * | 2/2002 | Knowles | G02B 26/106 235/472.01 |
| 2014/0191039 A1 | * | 7/2014 | Pang | G06K 7/10722 235/462.31 |

OTHER PUBLICATIONS

International Search Report and Written Opinion for International Application No. PCT/US2019/056108 dated Nov. 20, 2019.

* cited by examiner

Primary Examiner — Daniel St Cyr
(74) Attorney, Agent, or Firm — Yuri Astvatsaturov

(57) ABSTRACT

A barcode reader is provided. The barcode reader comprises an imaging assembly having a field of view (FOV) extending along one or more horizontal planes and a housing of the imaging assembly, the housing being a cuboid shape having six sides. The FOV of the imaging assembly passes through an opening in a first side of the housing with a width that is 1.5 inches or greater. The first side of the housing has a width that is greater than or equal to 2.5 inches and less than or equal to 3.5 inches, and has a height that is greater than or equal to 2.0 inches and less than or equal to 3.5 inches. The housing is substantially stable when at least a portion of a second side of the housing, substantially parallel to at least one of the one or more horizontal planes, is placed on a flat surface.

27 Claims, 12 Drawing Sheets

SCAN CUBE CHARACTERISTICS

BACKGROUND OF THE INVENTION

Currently, barcode scanners are mounted inside large kiosks for hands-free barcode scanning in many environments (e.g., in airports, restaurants, retail, cinemas, healthcare facilities, etc.). Currently barcode scanners are typically fixed in place within their respective kiosks, or otherwise have only one mounting option. Moreover, due to their exposed electronics and their cumbersome and odd shapes, current barcode scanners generally cannot be easily removed from their kiosks or otherwise repositioned. However, in some instances, the fixed angle and/or orientation of the barcode scanner in the kiosk may be inappropriate for reading certain barcodes, e.g., due to the barcode's size, location, shape, orientation, etc. Accordingly, there exists a need for a hands-free barcode scanner that can scan barcodes at a variety of orientations and angles. Moreover, there exists a need for a barcode scanner that is mountable or placeable at a variety of orientations and angles but that is still a size that is comfortable to pick up.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
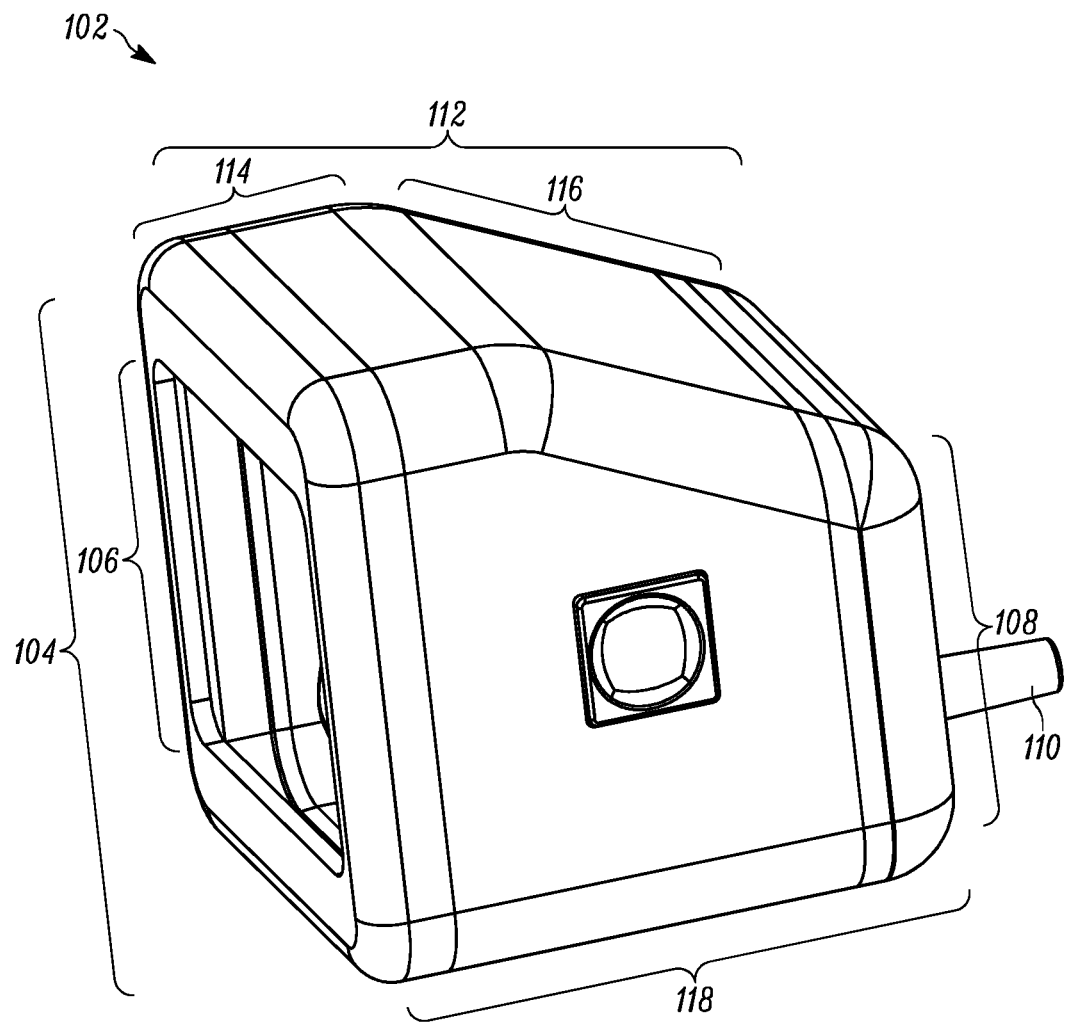
FIG. 1 illustrates an exemplary barcode reader, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an embodiment, the present invention is a barcode reader comprising an imaging assembly having a field of view (FOV) extending along one or more horizontal planes and a housing of the imaging assembly. The housing is a cuboid shape having six sides, with the FOV of the imaging assembly passing through an opening in a first side of the housing. Furthermore, the opening in the first side of the housing has a width that is greater than or equal to 1.5 inches, the first side of the housing has a width that is greater than or equal to 2.5 inches and less than or equal to 3.5 inches, and the first side of the housing has a height that is greater than or equal to 2.0 inches and less than or equal to 3.5 inches. The housing is substantially stable when at least a portion of a second side of the housing is placed on a flat surface, with the at least the portion of the second side being substantially parallel to at least one of the one or more horizontal planes.

In another embodiment, the present invention is a barcode reader comprising an imaging assembly having a field of view (FOV) extending along one or more horizontal planes and a housing of the imaging assembly. The housing is a cuboid shape having six sides, with the FOV of the imaging assembly passing through an opening in a first side of the housing. Furthermore, the first side of the housing and a second side of the housing share an edge, the opening in the first side of the housing has a width that is greater than or equal to 1.5 inches, and the first side of the housing has a width that is greater than or equal to 2.5 inches and less than or equal to 3.5 inches. The housing is substantially stable when at least a portion of a second side of the housing is placed on a flat surface, with the at least the portion of the second side being substantially parallel to at least one of the one or more horizontal planes.

In still another embodiment, the present invention is a system. The system includes a barcode reader, comprising an imaging assembly having a field of view (FOV) extending along one or more horizontal planes and a housing of the imaging assembly, the housing being a cuboid shape having six sides, wherein the FOV of the imaging assembly passes through an opening in a first side of the housing. The opening in the first side of the housing has a width that is greater than or equal to 1.5 inches, the first side of the housing has a width that is greater than or equal to 2.5 inches and less than or equal to 3.5 inches, and the first side of the housing has a height that is greater than or equal to 2.0 inches and less than or equal to 3.5 inches. Furthermore, the housing is substantially stable when at least a portion of a second side of the housing is placed on a flat surface, with the at least the portion of the second side being substantially parallel to at least one of the one or more horizontal planes. The system also includes a bracket having three surfaces configured to frictionally interact with at least three of the six sides of the housing of the imaging assembly.

In another embodiment, the present invention is a system. The system includes a barcode reader, comprising an imaging assembly having a field of view (FOV) extending along one or more horizontal planes and a housing of the imaging assembly. The housing is a cuboid shape having six sides, and the FOV of the imaging assembly passes through an opening in a first side of the housing. The opening in the first side of the housing has a width that is greater than or equal to 1.5 inches, the first side of the housing has a width that is greater than or equal to 2.5 inches and less than or equal to 3.5 inches, the first side of the housing has a height that is greater than or equal to 2.0 inches and less than or equal to 3.5 inches. Furthermore, the housing is substantially stable when at least a portion of a second side of the housing is placed on a flat surface, with the at least the portion of the second side being substantially parallel to at least one of the one or more horizontal planes. The system further includes a metal plate within the housing, the metal plate adjacent to the at least the portion of the second side of the housing, and a stand comprising a magnetic component configured to magnetically interact with the metal plate.

In still another embodiment, the present invention is a barcode reader, comprising an imaging assembly having a field of view (FOV) extending along one or more horizontal planes and a housing of the imaging assembly. The housing is a cuboid shape having six sides, with the FOV of the imaging assembly passing through an opening in a first side of the housing. The opening in the first side of the housing has a width that is greater than or equal to 1.5 inches, the first side of the housing has a width that is greater than or equal to 2.5 inches and less than or equal to 3.5 inches, and the first side of the housing has a height that is greater than or equal to 2.0 inches and less than or equal to 3.5 inches. Furthermore, the housing is substantially stable when at least a portion of a second side of the housing is placed on a flat surface, with the at least the portion of the second side is obliquely angled relative to a third side opposite the second side.

Referring now to the drawings, FIG. 1 illustrates an exemplary barcode reader 100, in accordance with an embodiment of the present invention. The barcode reader 100 includes an imaging assembly (not shown) and a housing 102 containing the imaging assembly. As shown in FIG. 1, the housing 102 of the imaging assembly is generally cuboid in shape with six sides. For instance, the general shape of the housing 102 may be a cube or a prism (e.g., a rectangular prism, a trapezoidal prism, etc.) Of course, the housing 102 is not necessarily a perfect cube or a perfect prism in all embodiments. For instance, edges and/or corners of the housing 102 may be rounded to allow for a comfortable grip by a user.

In particular, one of the sides 104 of the housing 102 contains an opening 106 (e.g., a window) through which the imaging assembly captures images (e.g., images of barcodes for scanning). Generally speaking, when the imaging assembly is a one-dimensional imaging assembly, the field of view (FOV) of the imaging assembly extends along one or more horizontal planes passing through the opening 106. Of course, when the imaging assembly is a two-dimensional imaging assembly, the FOV also extends along one or more vertical planes through the opening 106. For example, the FOV of the imaging assembly may be designed to fill the opening 106. Opposite the opening 106, a side 108 of the housing 102 may include a communication connector 110 configured to receive a communication cable through an aperture the side 108, e.g., for powering the imaging assembly and/or for transmitting captured images externally.

The length and width of each side of the housing 102 are each between 2.0 inches and 3.5 inches. In some embodiments, the length and width of each side of the housing 102 are substantially equal. The size of the housing 102 advantageously allows the housing 102 to be easily picked up by users as needed. The width of the opening 106 is generally greater than 1.5 inches. This wide opening ensures that even the widest codes can be easily read. Moreover, generally speaking, each of the sides are flat and may be used as mounting/attachment surfaces. Each of the six sides of the housing 102 may include multiple non-parallel portions. For instance, the side 112 shown in FIG. 1 includes two such portions 114 and 116. Generally speaking, the housing 102 is substantially stable when a side (or a portion of a side) that is parallel to one of the horizontal FOV planes passing through the opening 106 of the housing 102 is placed on a flat surface. In some examples, the horizontal planes include a central horizontal plane, and the housing 102 is substantially stable when a side or portion of a side that is substantially parallel to the central horizontal plane is placed on a flat surface. For instance, the housing 102 may be substantially stable when side 118 is placed on a flat surface.

Moreover, in some examples, the housing 102 may be substantially stable both when a first side (or a portion of a first side) is placed on a flat surface and when also when a second side (or a portion of a second side) is placed on a flat surface. These first and second sides (or portions of first and second sides sides) may be opposite one another, but not necessarily parallel to one another. For instance, as shown in FIG. 1, the housing 102 may be substantially stable when portion 116 of the side 112 is placed on a flat surface, or when the side 118 (which is not parallel to portion 116 of side 112) is placed on a flat surface.

Figure 2:
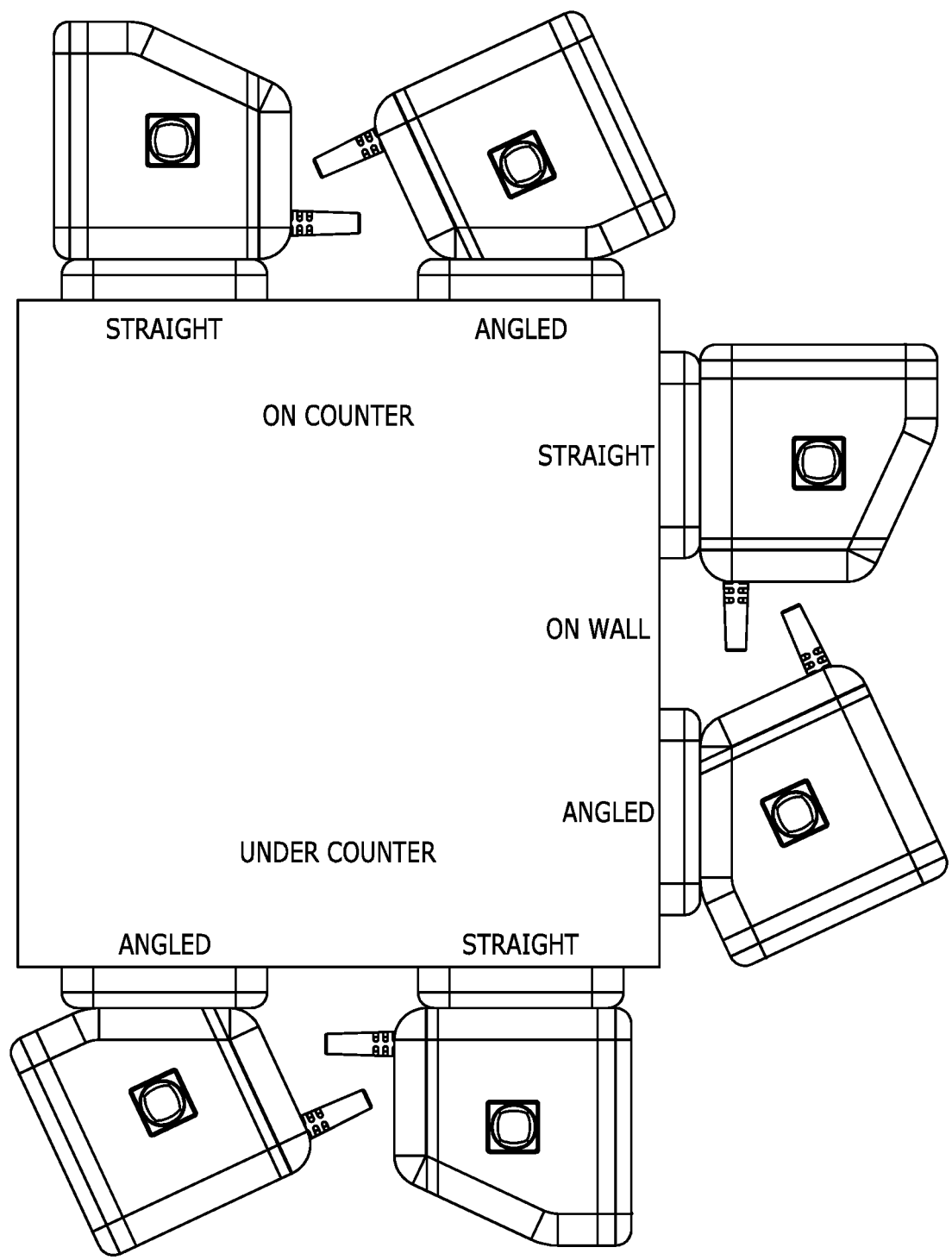
FIG. 2 illustrates a variety of exemplary mounting positions for a barcode reader, in accordance with embodiments of the present invention.

For example, FIG. 2 illustrates a variety of exemplary mounting positions for the barcode reader 100, in accordance with embodiments of the present invention. As shown in FIG. 2, at least two sides (or portions thereof) of the six-sided housing 102 may be placed on or mounted to a flat surface in many different ways for scanning barcodes in many different orientations. For instance, the housing 102 may be placed on or mounted to a flat surface (e.g., a counter) for a straight hands-free barcode scan, or an angled hands-free barcode scan, depending on which side or which portion of a side is placed on or mounted to the flat surface.

Figure 3A:
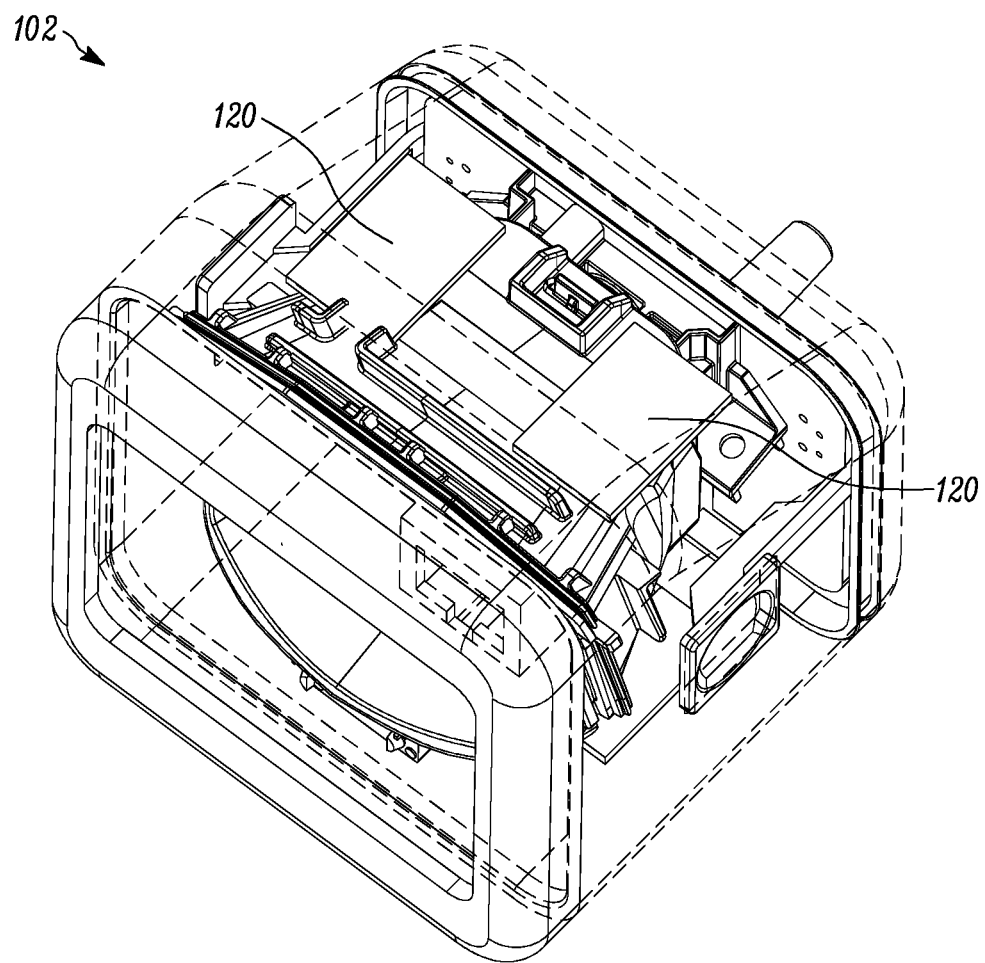
FIGS. 3A and 3B illustrate metal plates inside the housing of an exemplary barcode reader, in accordance with an embodiment of the present invention.
Figure 3B:
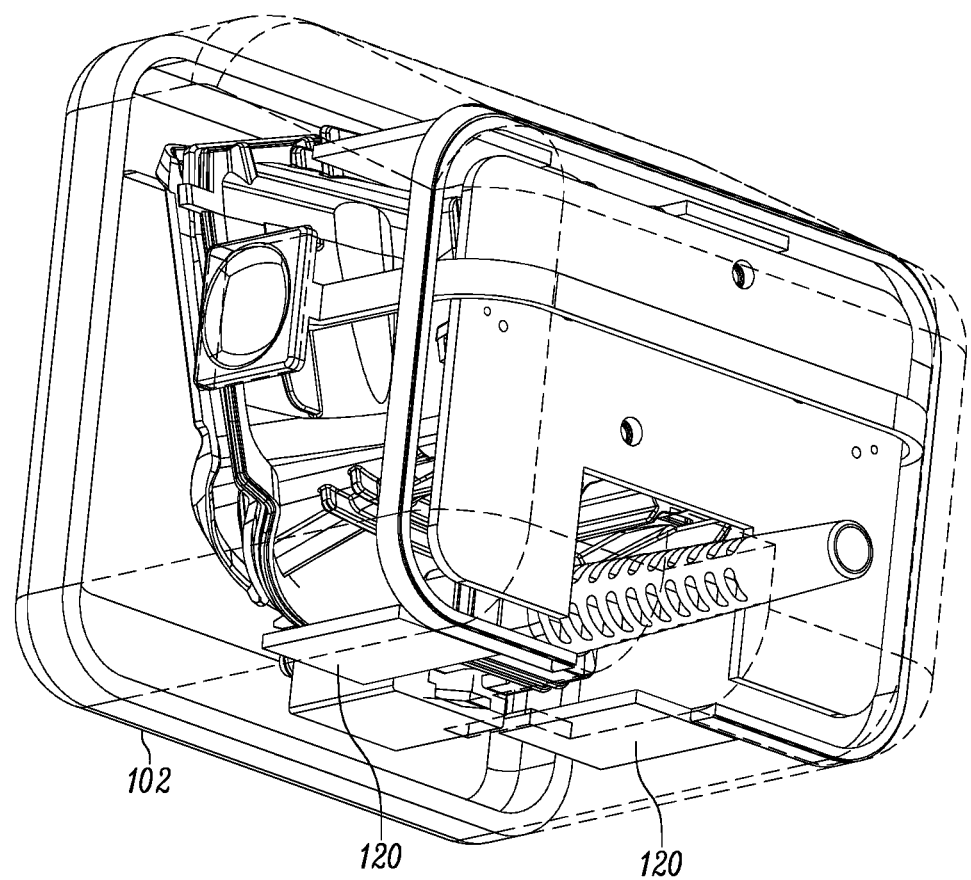

Moreover, as shown in FIG. 2, sides or portions of sides of the housing 102 may be mounted to a wall, or mounted under a counter, for straight or angled barcode scans in various directions. In one example, the housing 102 may be mounted to a wall or under a counter magnetically. For instance, FIGS. 3A and 3B illustrate metal plates 120 inside the housing 102 of a barcode reader 100. These metal plates 120 may allow the housing 102 to be attached to a wall mount or an under-counter mount that includes a magnet. These metal plates 120 may be placed under any of the sides of the housing 102 to allow the side to be mounted magnetically. For example, the metal plates 120 may be placed under a top side of the housing 102, as shown in FIG. 3A, placed under a bottom side of the housing 102, as shown in FIG. 3B, placed under both a top and bottom side of the housing 102, etc.

Figure 4:
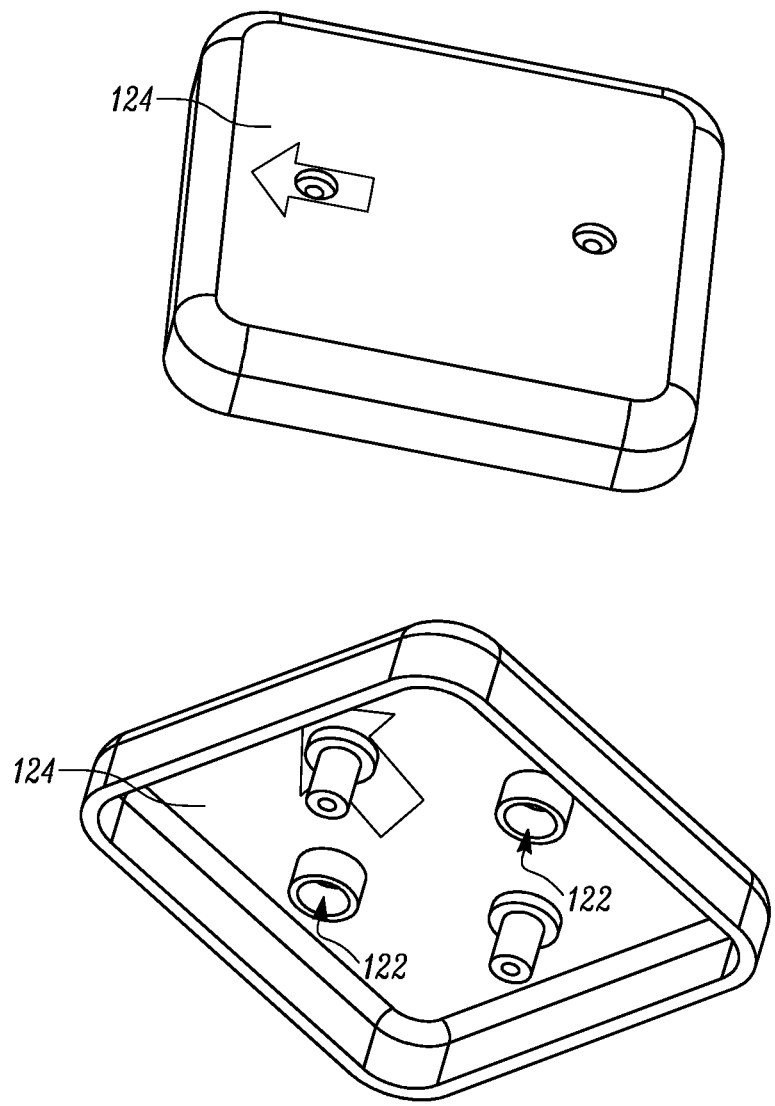
FIG. 4 illustrates magnets hidden beneath cosmetic sockets of a barcode reader, in accordance with an embodiment of the present invention.

FIG. 4 illustrates magnets 122 (e.g., neodymium magnets) hidden beneath cosmetic sockets of a mount 124 for a barcode reader 100. Accordingly, the mount 124 may be affixed to a wall, a counter, or some other surface, and the housing 102 may be magnetically attached to the mount 124 and/or removed from the mount 124 as needed. Moreover, in some embodiments, a plurality of such mounts 124 may be affixed to various surfaces, so that the barcode reader 100 may be attached and removed from these mounts 124 affixed to the various surfaces as needed by the user. Accordingly, the barcode reader 100 may be held firmly in various orientations, including on walls and under counters, for hands-free scanning of barcodes in different locations or orientations.

Figure 5:
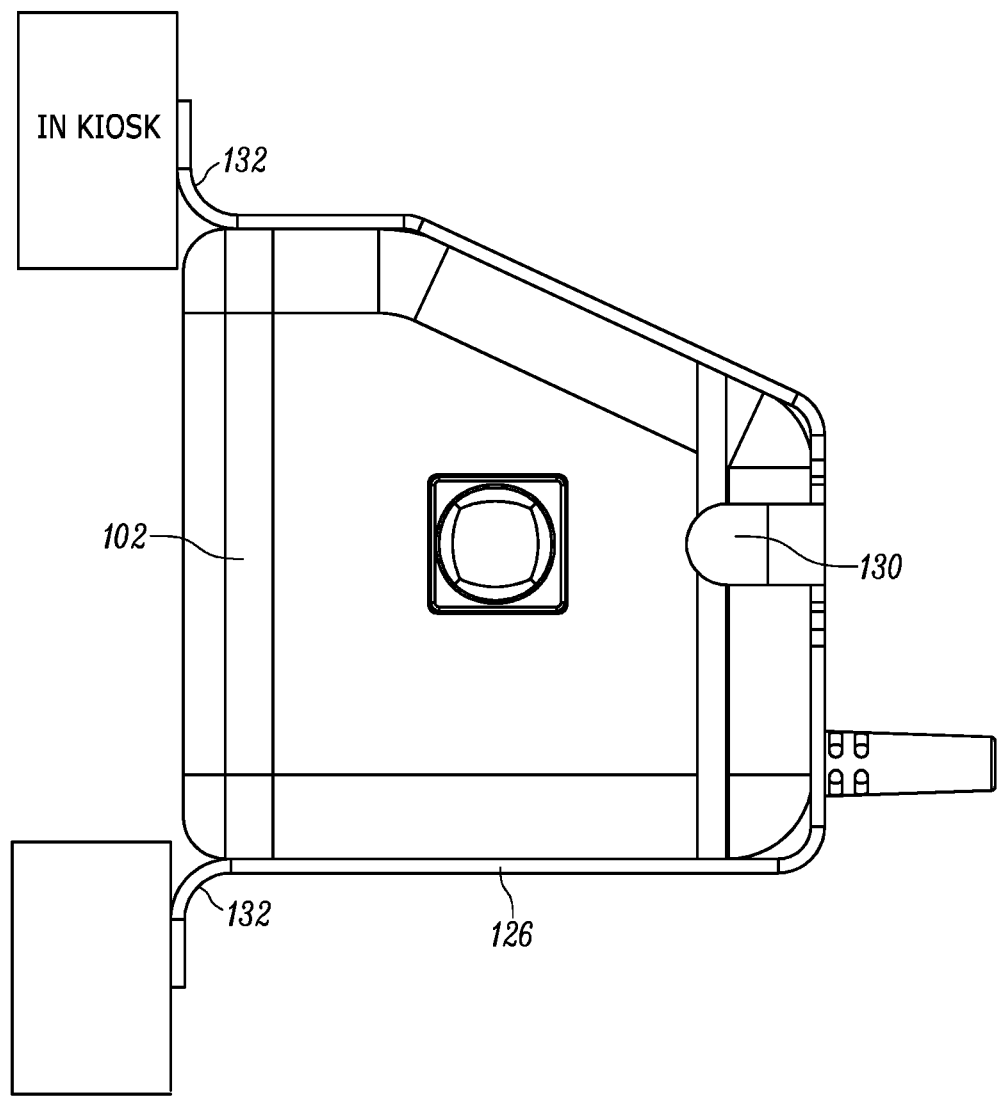
FIG. 5 illustrates a barcode reader supported in a kiosk via a bracket, in accordance with an embodiment of the present invention.
Figure 6A:
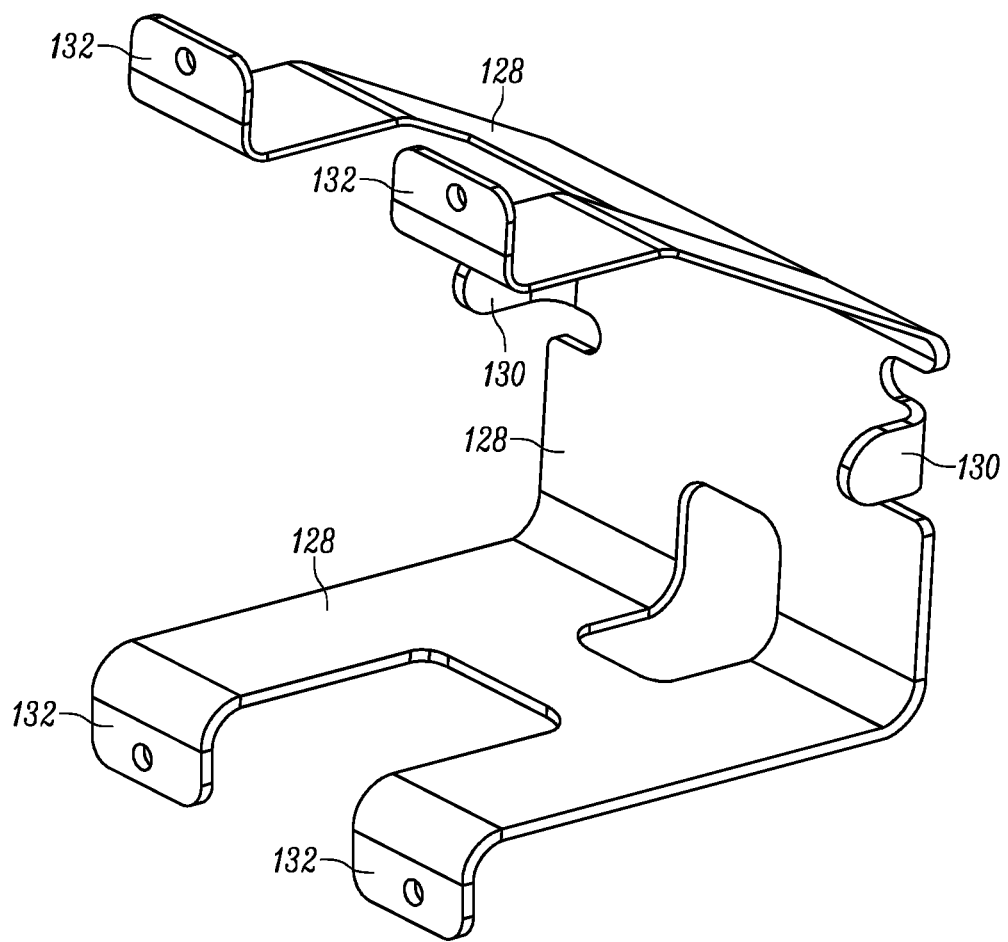
FIG. 6A illustrates an exemplary bracket, in accordance with an embodiment of the present invention.
Figure 6B:
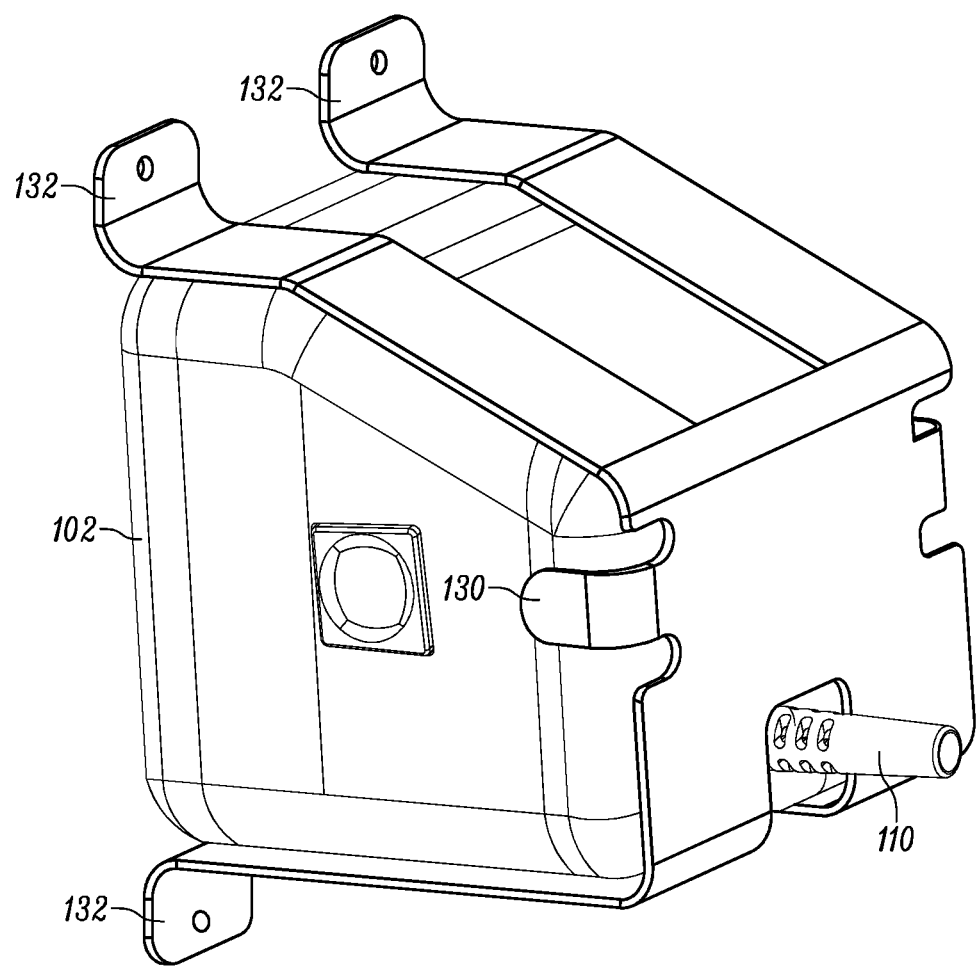
FIG. 6B illustrates an exemplary bracket supporting a barcode reader, in accordance with an embodiment of the present invention.

Additionally, as shown in FIG. 5, the housing 102 of the barcode reader 100 may be mounted inside of a kiosk using a bracket 126. For example, as shown in FIG. 5, the bracket 126 may be affixed to the inside of an opening of a kiosk. The bracket 126 may be sized to receive the housing 102 of a barcode reader 100 inserted through the opening of the kiosk. For instance, FIG. 6A illustrates an exemplary bracket 126, and FIG. 6B illustrates an exemplary bracket 126 supporting a housing 102 of a barcode reader 100. The bracket 126 may include surfaces 128 configured to frictionally interact with at the sides of the housing 102 of the imaging assembly. For instance, the bracket 126 may include three surfaces 128 configured to frictionally interact with three of the six sides of the housing 102 to hold the barcode reader 100 in place within the bracket 126. In some embodiments, the bracket 126 further includes a set of flanges 130 configured to hold the barcode reader 100 in place within the bracket 126. Additionally, the bracket 126 may include "wings" 132 extending away from and parallel to the side of the housing 102 with the opening, to hold the bracket 126 in placed within the kiosk opening. Accordingly, a user may insert the barcode reader 100 into the kiosk via the bracket 126, or remove the barcode reader 100 from the bracket 126, as needed, so that the barcode reader 100 may be used both within and outside of the kiosk.

Figure 7:
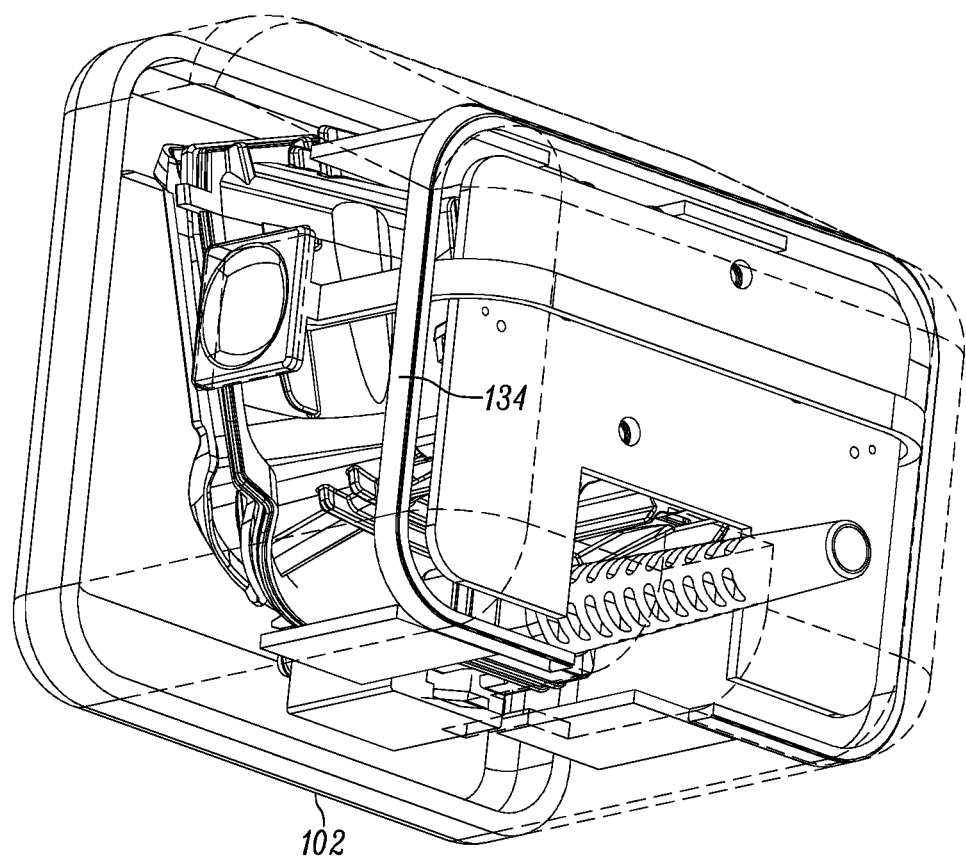
FIG. 7 illustrates a barcode reader with an indicator light visible from multiple sides of the housing of the barcode reader, in accordance with an embodiment of the present invention.

As shown in FIG. 7, an example housing 102 may include an indicator light 134 wrapping around (or otherwise visible from) multiple sides of the housing 102 (e.g., three of the six sides), and configured to provide an alert (e.g., an illumination, blinking, flashing, a certain color, etc.) indicating a successful read of a barcode. In some instances, the indicator light may include multiple lights on the multiple sides of the housing 102. Advantageously, because the indicator light is visible from multiple sides of the housing 102, users can determine whether a scan is successful even when the orientation of the barcode reader 100 is modified.

Figure 8A:
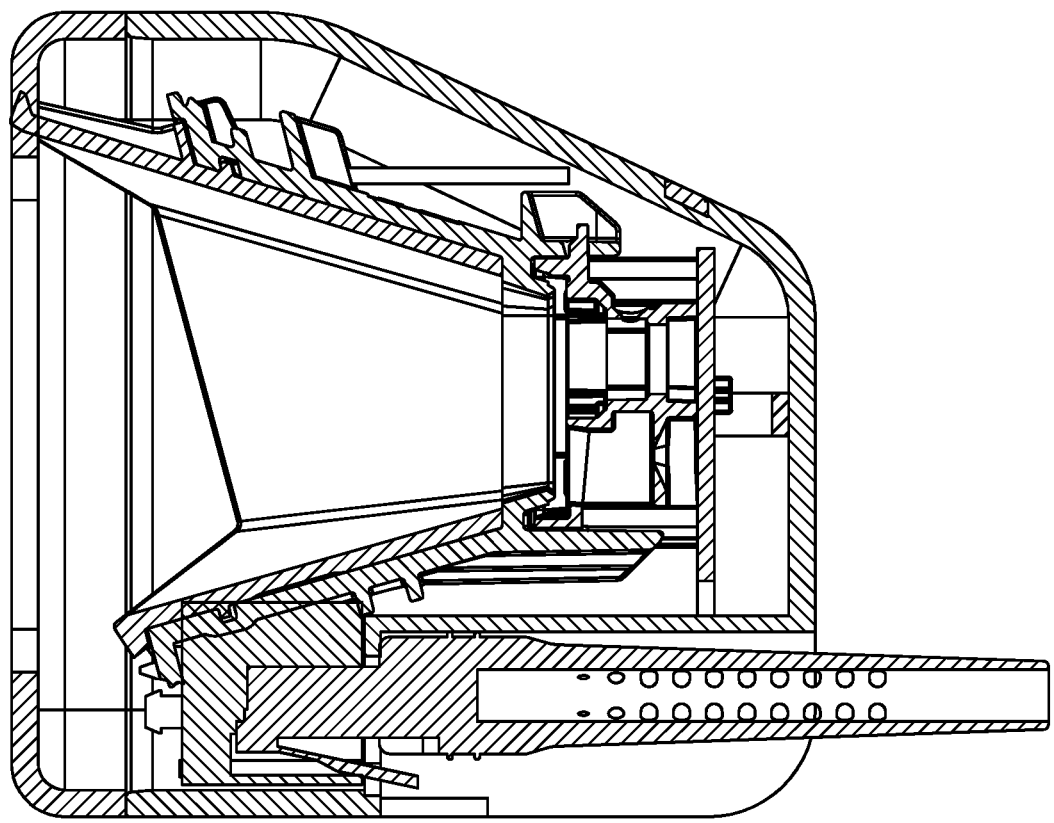
FIGS. 8A-8C illustrate a variety of opto-mechanical layouts for an exemplary barcode reader, in accordance with embodiments of the present invention.
Figure 8B:
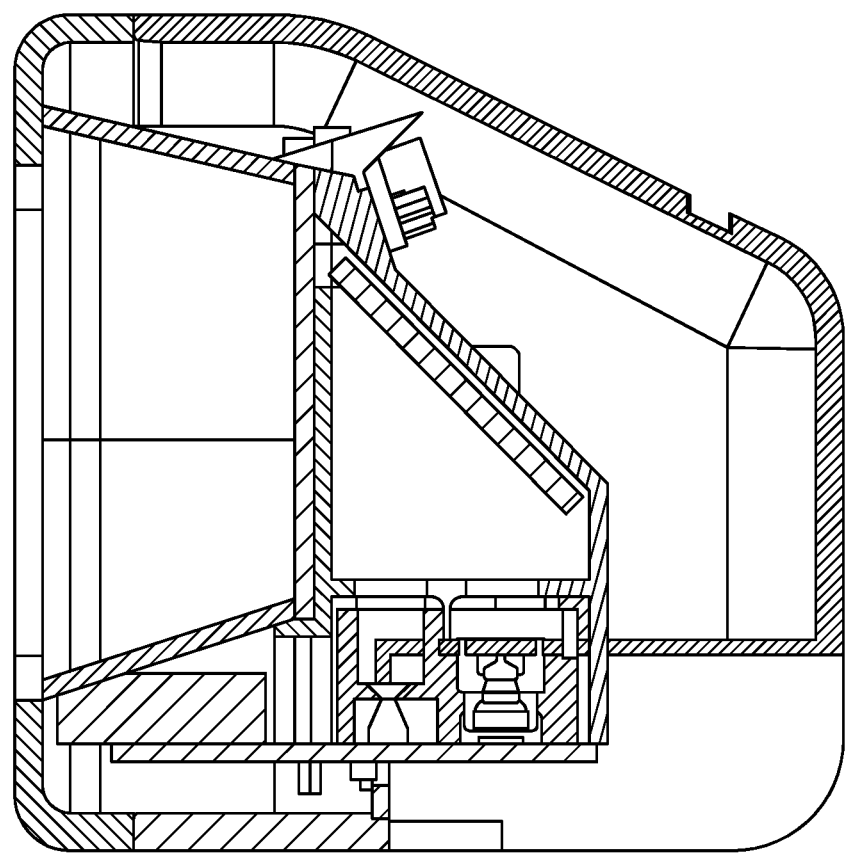
Figure 8C:
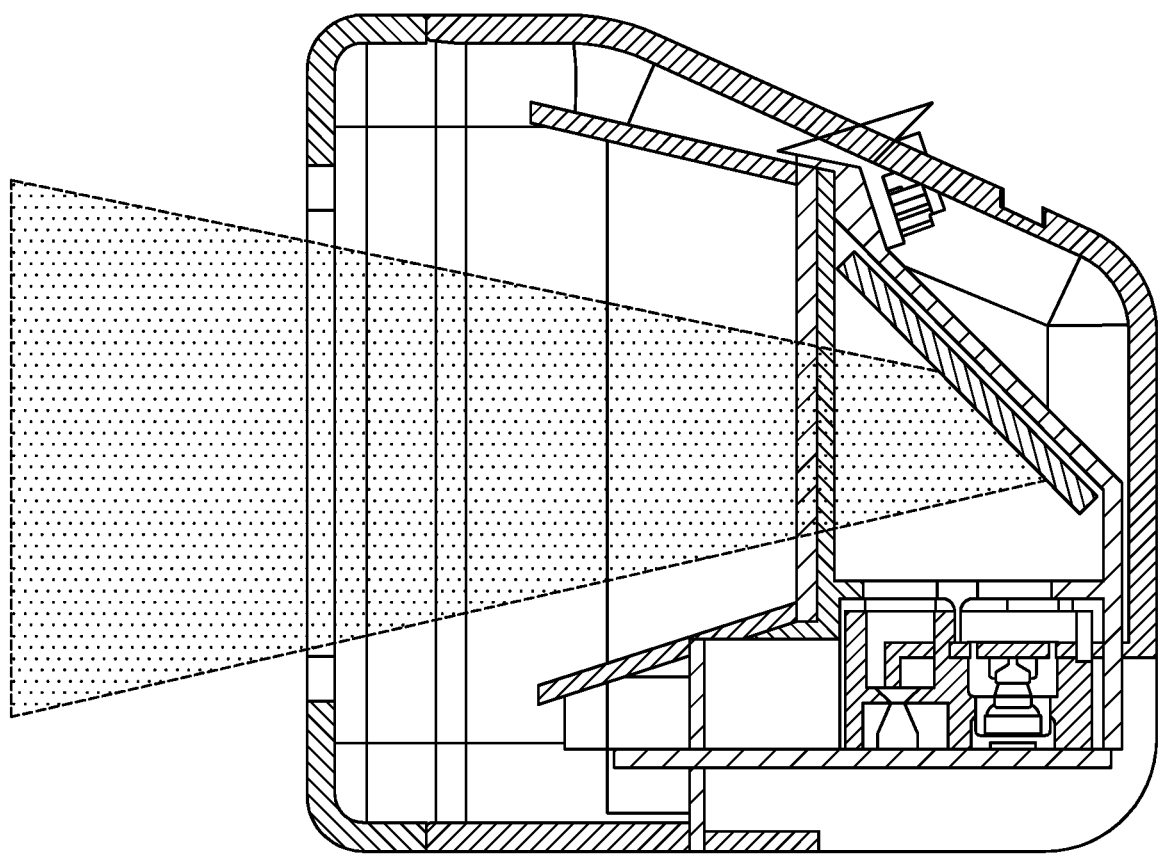

FIGS. 8A-8C illustrate a variety of opto-mechanical layouts for an exemplary barcode reader 100, in accordance with embodiments of the present invention.

FIG. 8A illustrates an exemplary opto-mechanical layout for a barcode reader. The opto-mechanical layout shown in FIG. 8A has a single rear PCB and an off-PCB forward connector that allows the cable's strain relief to recess inside the housing. In the exemplary opto-mechanical layout shown in FIG. 8A, the opto-mechanics are mounted on the single PCB and recessed as far as possible to achieve the maximum width of the FOV at the nose of the scanner.

FIG. 8B illustrates another exemplary opto-mechanical layout for a barcode reader. In the opto-mechanical layout shown in FIG. 8B, a bottom PCB and a fold mirror are utilized to minimize the depth of the scanner. In some embodiments, using the opto-mechanical layout shown in FIG. 8B, the housing size may be reduced for a smaller depth scanner. Generally speaking, a barcode reader using the opto-mechanical layout shown in FIG. 8B may use a micro-USB or USB-C connector (rather than, e.g., a full-sized RJ45 connector) on the single rear PCB.

Advantageously, the opto-mechanical layout as shown in FIG. 8B provides an illumination that is off-axis, which reduces problems with specular reflections from barcodes. Furthermore, the opto-mechanical layout shown in FIG. 8B allows for an even wider FOV than the opto-mechanical layout shown in FIG. 8A, which is beneficial for reading wider barcodes close to the nose of the scanner.

FIG. 8C illustrates an opto-mechanical layout for a barcode reader that is optimized for lower cost opto-mechanics. Generally speaking, the opto-mechanical layout shown in FIG. 8C uses lower resolution sensor with a narrower FOV than in other opto-mechanical layouts. By using the fold mirror and pushing the opto-mechanics back as far as possible in the housing, a fairly wide FOV can be obtained at the nose of the scanner, despite a smaller FOV angle than other opto-mechanical layouts.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A barcode reader, comprising: an imaging assembly having a field of view (FOV) extending along one or more horizontal planes: a housing of the imaging assembly, the housing being an exterior housing configured to be directly handled by an operator or be directly interfaced, with a support bracket that is fixedly mounted to a support surface, the housing being a cuboid shape having six sides wherein the FOV of the imaging assembly passes through an opening in a first side of the housing, wherein the opening in the first side of the housing has a width that is greater than or equal to 1.5 inches, wherein the first side of the housing has a width that is greater than or equal to 2.5 inches and less than or equal to 3.5 inches, wherein the first side of the housing has a height that is greater than or equal to 2.0 inches and less than or equal to 3.5 inches, wherein the housing is substantially stable when at least a portion of a second side of the housing is placed on a flat surface, the at least the portion of the second side being substantially parallel to at least one of the one or more horizontal planes, and wherein the housing includes a third side, wherein the third side is opposite the second side, and wherein the housing is substantially stable when a first portion of the third side of the housing is placed on a flat surface, and wherein the first portion of the third side is not parallel to the at least the portion of the second side.

2. The barcode reader of claim 1, wherein the one or more horizontal planes include a central horizontal plane, and wherein the at least the portion of the second side is substantially parallel to the central horizontal plane.

3. The barcode reader of claim 1, wherein the housing has a depth that is greater than or equal to 2.0 inches and less than or equal to 3.5 inches.

4. The barcode reader of claim 1, wherein the cuboid shape is a prism shape.

5. The barcode reader of claim 4, wherein a fourth side and a fifth side of the housing form a base of the prism, and wherein each of the fourth side of the housing and the fifth side of the housing is substantially perpendicular to the first side of the housing.

6. The barcode reader of claim 1, further comprising:
an indicator light extending along at least three of the six sides of the housing, the indicator light configured to provide an alert indicating a successful read of a barcode.

7. The barcode reader of claim 1, further comprising:
a communication connector configured to receive a communication cable through an aperture in a sixth side of the housing, the sixth side of the housing being opposite the first side of the housing.

8. The barcode reader of claim 1, wherein the imaging assembly comprises a two dimensional imager, and wherein the FOV also extends along one or more vertical planes.

9. The barcode reader of claim 1, wherein the FOV has a width at the opening in the first side of the housing that is greater than or equal to 2 inches.

10. A barcode reader, comprising: an imaging assembly having a field of view (FOV) extending along one or more horizontal planes; a housing of the imaging assembly, the housing being an exterior housing configured to be directly handled by an operator or be directly interfaced with a support bracket that is fixedly mounted to a support surface, the housing being a cuboid shape having six sides, wherein the FOV of the imaging assembly passes through an opening in a first side of the housing, wherein the first side and a second, side of the housing share an edge; wherein the opening in the first side of the housing has a width that is greater than, or equal to 1.5 inches, wherein the first side of the housing has a width that is greater than or equal to 2.5 inches and less than or equal to 3.5 inches, wherein the housing is substantially stable when at least a portion of a second side of the housing is placed on a flat surface, the at least the portion of the second side being substantially parallel to at least one of the one or more horizontal planes; and an indicator light extending along at least three of the six sides of the housing, the indicator light configured to provide an alert indicating a successful read of a barcode.

11. The barcode reader of claim 10, wherein the first side of the housing has a height that is greater than or equal to 2.0 inches and less than or equal to 3.5 inches.

12. The barcode reader of claim 10, wherein the one or more horizontal planes include a central horizontal plane, and wherein the at least the portion of the second side is substantially parallel to the central horizontal plane.

13. The barcode reader of claim 10, wherein the housing includes a third side opposite the second side, and
wherein the housing is substantially stable when a first portion of the third side of the housing is placed on a flat surface, and wherein the first portion of the third side is not parallel to the at least the portion of the second side.

14. The barcode reader of claim 10, wherein the housing has a depth that is greater than or equal to 2.0 inches and less than or equal to 3.5 inches.

15. The barcode reader of claim 10, wherein the cuboid shape is a prism shape.

16. The barcode reader of claim 15, wherein a fourth side and a fifth side of the housing form a base of the prism, and wherein each of the fourth side of the housing and the fifth side of the housing is substantially perpendicular to the first side of the housing.

17. The barcode reader of claim 10, further comprising:
a communication connector configured to receive a communication cable through an aperture in a sixth side of the housing, the sixth side of the housing being opposite the first side of the housing.

18. The barcode reader of claim 10, wherein the imaging assembly comprises a two dimensional imager, and wherein the FOV also extends along one or more vertical planes.

19. The barcode reader of claim 10, wherein the FOV has a width at the opening in the first side of the housing that is greater than or equal to 2 inches.

20. A system comprising:
a barcode reader, comprising:
an imaging assembly having a field of view (FOV) extending along one or more horizontal planes; and
a housing of the imaging assembly, the housing being an exterior housing configured to be directly handled by an operator or be directly interfaced with a support bracket that is fixedly mounted to a support surface, the housing being a cuboid shape having six sides, wherein the FOV of the imaging assembly passes through an opening in a first side of the housing,
wherein the opening in the first side of the housing has a width that is greater than or equal to 1.5 inches,
wherein the first side of the housing has a width that is greater than or equal to 2.5 inches and less than or equal to 3.5 inches,
wherein the first side of the housing has a height that is greater than or equal to 2.0 inches and less than or equal to 3.5 inches,
wherein the housing is substantially stable when at least a portion of a second side of the housing is placed on a flat surface, the at least the portion of the second side being substantially parallel to at least one of the one or more horizontal planes, and
wherein the support bracket has three surfaces configured to frictionally interact with at least three of the six sides of the housing of the imaging assembly, and a fourth surface configured to be fixedly secured to the support surface.

21. The system of claim 20, wherein the fourth surface includes a set of wings extending away from the first side, wherein the wings are substantially parallel to the first side.

22. The system of claim 20, wherein the bracket further includes a set of flanges extending at an angle that is substantially perpendicular to at least a portion of one of the three sides.

23. The system of claim 20, wherein the imaging assembly comprises a two dimensional imager, and wherein the FOV also extends along one or more vertical planes.

24. A system comprising:
a barcode reader, comprising:
an imaging assembly having a field of view (FOV) extending along one or more horizontal planes; and
a housing, the housing being an exterior housing configured to be directly handled by an operator, the housing being a cuboid shape having six sides, wherein the FOV of the imaging assembly passes through an opening in a first side of the housing,
wherein the opening in the first side of the housing has a width that is greater than or equal to 1.5 inches,
wherein the first side of the housing has a width that is greater than or equal to 2.5 inches and less than or equal to 3.5 inches,
wherein the first side of the housing has a height that is greater than or equal to 2.0 inches and less than or equal to 3.5 inches, and
wherein the housing is substantially stable when at least a portion of a second side of the housing is placed on a flat surface, the at least the portion of the second side being substantially parallel to at least one of the one or more horizontal planes;
a metal plate within the housing, the metal plate adjacent to the at least the portion of the second side of the housing; and
a stand comprising a magnetic component configured to magnetically interact with the metal plate.

25. The system of claim 24, wherein the imaging assembly comprises a two dimensional imager, and wherein the FOV also extends along one or more vertical planes.

26. A barcode reader, comprising:
an imaging assembly having a field of view (FOV) extending along one or more horizontal planes; and
a housing, the housing being an exterior housing configured to be directly handled by an operator or be directly interfaced with a support bracket that is fixedly mounted to a support surface, the housing being a cuboid shape having six sides, wherein the FOV of the imaging assembly passes through an opening in a first side of the housing,
wherein the opening in the first side of the housing has a width that is greater than or equal to 1.5 inches,
wherein the first side of the housing has a width that is greater than or equal to 2.5 inches and less than or equal to 3.5 inches,
wherein the first side of the housing has a height that is greater than or equal to 2.0 inches and less than or equal to 3.5 inches, and
wherein the housing is substantially stable when at least a portion of a second side of the housing is placed on a flat surface, and wherein the at least the portion of the second side is obliquely angled relative to a third side, the third side being opposite the second side.

27. The system of claim 26, wherein the imaging assembly comprises a two dimensional imager, and wherein the FOV also extends along one or more vertical planes.

\* \* \* \* \*